US 6,637,279 B2

(12) United States Patent
Kroll et al.

(10) Patent No.: US 6,637,279 B2
(45) Date of Patent: Oct. 28, 2003

(54) SENSOR ASSEMBLY

(75) Inventors: Peter Kroll, Neckartailfingen (DE); Michael Peter Rathmachers, Dettingen/Erms (DE)

(73) Assignee: Balluff GmbH, Neuhausen (DE)

( * ) Notice: Subject to any disclaimer, the term of this patent is extended or adjusted under 35 U.S.C. 154(b) by 68 days.

(21) Appl. No.: 09/920,518

(22) Filed: Aug. 1, 2001

(65) Prior Publication Data
US 2002/0014128 A1 Feb. 7, 2002

(30) Foreign Application Priority Data
Aug. 4, 2000 (DE) .......................................... 100 38 001

(51) Int. Cl.⁷ .............................................. G01D 21/00
(52) U.S. Cl. ..................................................... 73/866.5
(58) Field of Search ................................ 73/866.5, 660, 73/661, 431; 324/207.2

(56) References Cited

U.S. PATENT DOCUMENTS

| | | | | |
|---|---|---|---|---|
| 4,495,810 A | * | 1/1985 | Tessarzik et al. | 73/432 R |
| 5,018,384 A | * | 5/1991 | Hayashi et al. | 73/118.1 |
| 6,007,034 A | | 12/1999 | Stoll et al. | |
| 6,067,843 A | * | 5/2000 | Hafele et al. | 73/31.05 |
| 6,079,286 A | * | 6/2000 | Struble | 73/866.5 |
| 6,089,111 A | * | 7/2000 | Machijima | 73/866.5 |
| 6,354,162 B1 | * | 3/2002 | Bobay et al. | 73/866.5 |
| 2002/0014128 A1 | * | 2/2002 | Kroll et al. | 73/866.5 |

FOREIGN PATENT DOCUMENTS

| | | |
|---|---|---|
| DE | 35 07 167 | 9/1986 |
| DE | 90 17 460 | 9/1992 |
| DE | 43 12 062 | 10/1994 |
| DE | 43 27 655 | 2/1995 |
| DE | 29 717 492 | 1/1998 |

OTHER PUBLICATIONS

Richter, O., and Voss, R.: Textbook excerpt from Bauelemente der Feinmechanik, 4. Auflage, Berlin, Verlag Technik GmbH, 1949, pp. 238–249.

* cited by examiner

Primary Examiner—Helen Kwok
Assistant Examiner—Charles D Garber
(74) Attorney, Agent, or Firm—Barry R. Lipsitz; Douglas M. McAllister

(57) ABSTRACT

In order to improve a sensor assembly comprising a sensor which can be fixed in position on a functional unit and has a sensor housing, in which a sensor element with evaluation electronics is arranged, in such a manner that as simple and universal a fixing of the sensor as possible on the functional unit is feasible it is suggested that the sensor assembly comprises a sensor holder which can be brought into a position following the sensor housing in longitudinal direction and can be detachably connected to the sensor housing in this position by means of form-locking elements and that the sensor be fixable on the functional unit by means of the sensor holder.

22 Claims, 7 Drawing Sheets

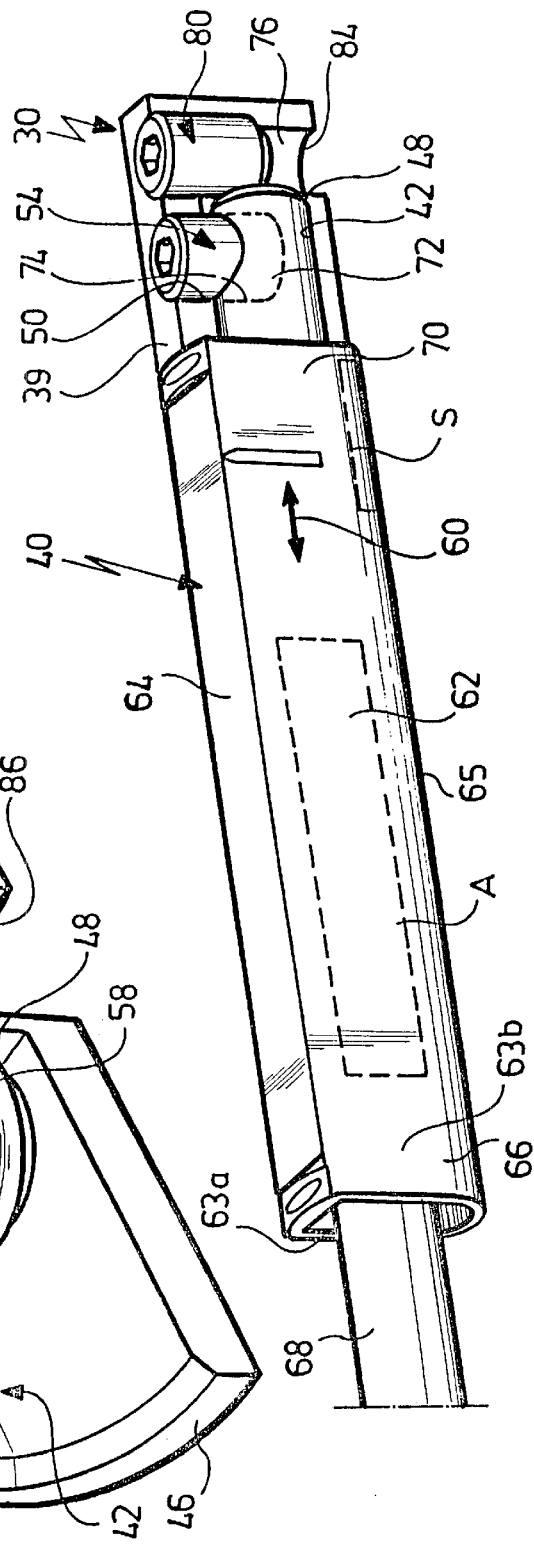

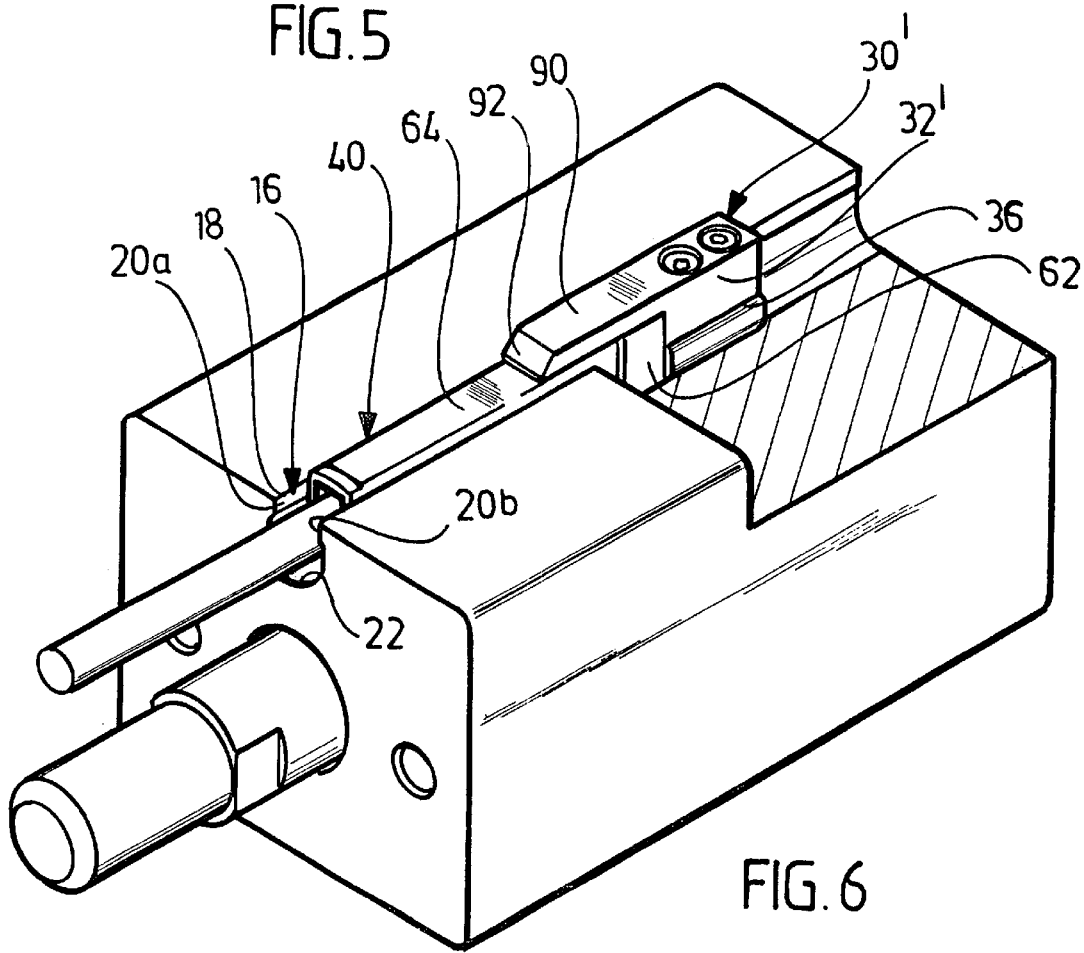
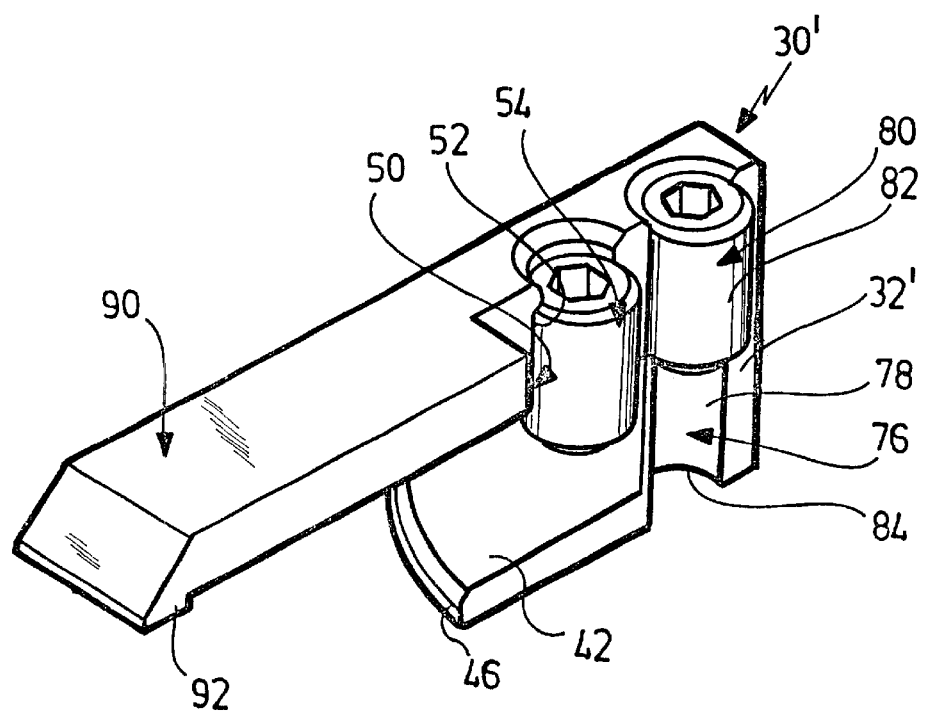

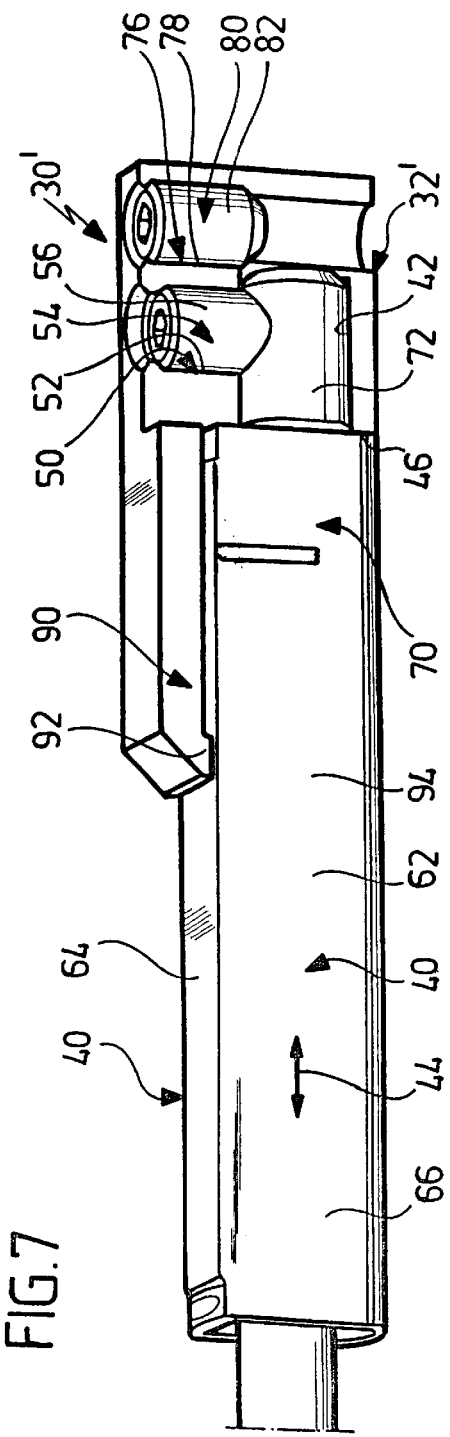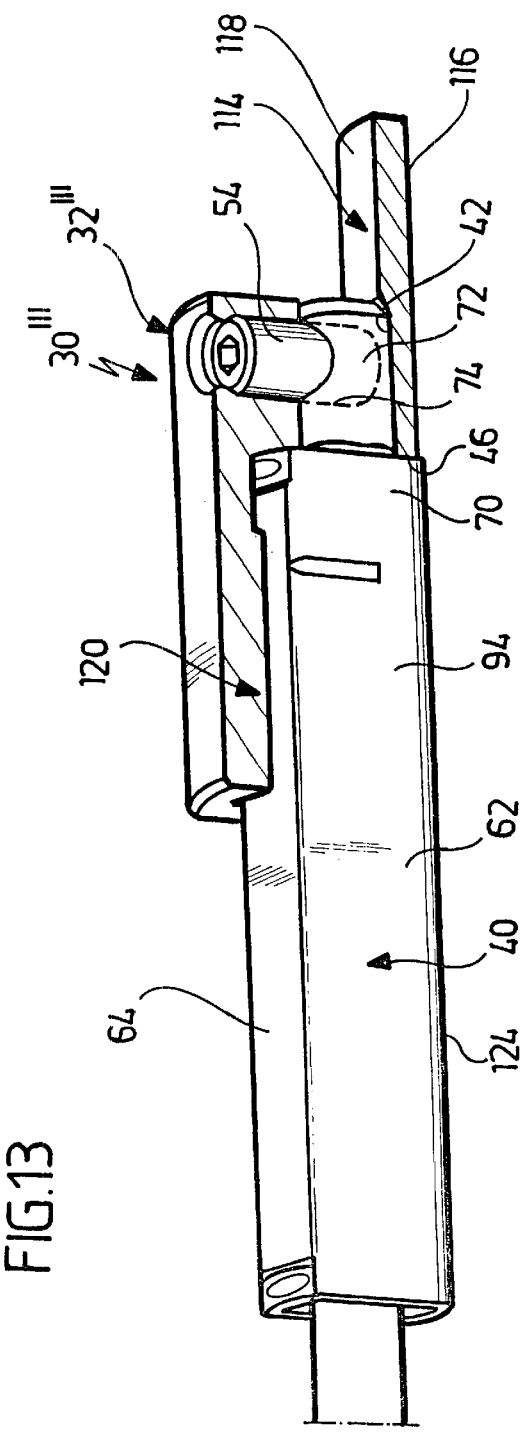

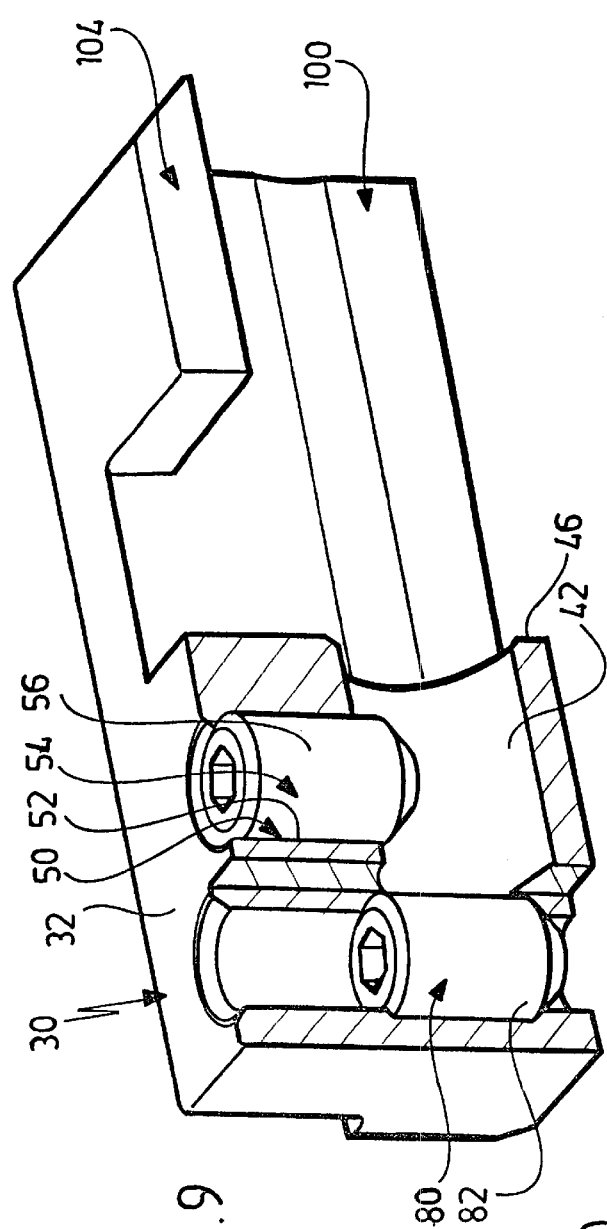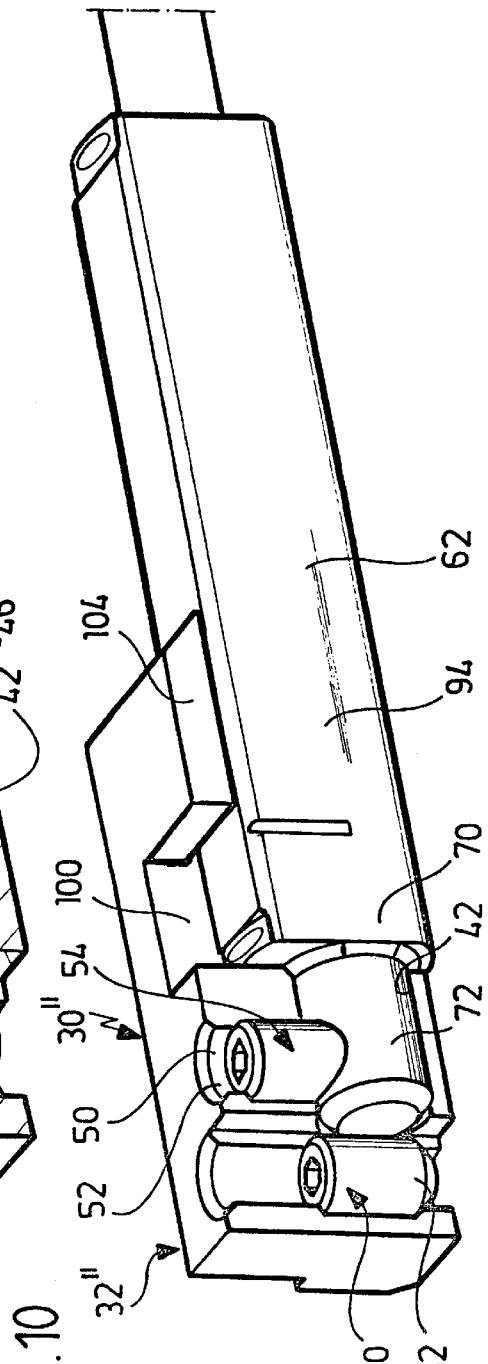

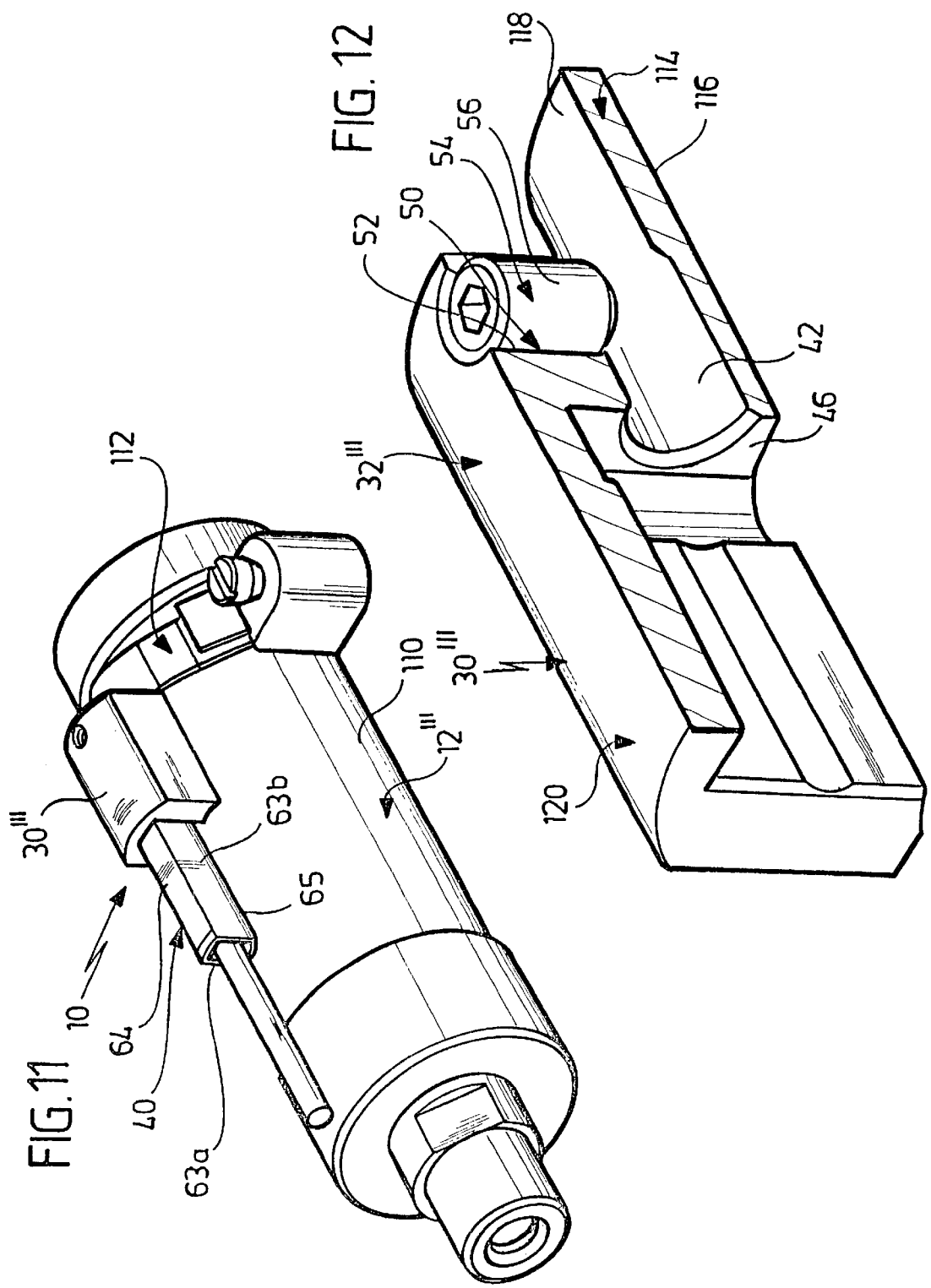

SENSOR ASSEMBLY

The present disclosure relates to the subject matter disclosed in German application No. 100 38 001.8 of Aug. 4, 2000, which is incorporated herein by reference in its entirety and for all purposes.

BACKGROUND OF THE INVENTION

The invention relates to a sensor assembly comprising a sensor which can be fixed in position on a functional unit and has a sensor housing, in which a sensor element with evaluation electronics is arranged.

In the case of known sensor assemblys of this type, the sensor housing itself is provided with elements to fix it in position directly on the functional unit, wherein these elements are always adapted to the respective fixing possibilities on the functional unit.

The object underlying the invention is therefore to improve a sensor assembly of the generic type in such a manner that as simple and universal a fixing of the sensor as possible on the functional unit is possible.

SUMMARY OF THE INVENTION

This object is accomplished in accordance with the invention, in a sensor assembly of the type described at the outset, in that the sensor assembly comprises a sensor holder which can be brought into a position following the sensor housing in longitudinal direction and can be detachably connected to the sensor housing in this position in a form-locking manner by means of form-locking elements and that the sensor can be fixed in position on the functional unit by means of the sensor holder.

The advantage of the inventive solution is to be seen in the fact that, on the one hand, a simple possibility exists, as a result of adaptation of the sensor holder, of carrying out an adaptation of the sensor assembly to the most varied of functional units and that, in addition, due to the fact that the sensor holder is arranged so as to follow the sensor housing in longitudinal direction, a construction of the sensor assembly results which makes it possible to adapt this in an optimum manner to the most varied of installation possibilities, in particular, the possibility exists of accommodating the sensor assembly in grooves or other elongated recesses in the functional unit.

With respect to the design of the form-locking elements, no further details have so far been given. One advantageous embodiment, for example, provides for one of the form-locking elements to be a projection and the other a recess.

In this respect, the form-locking elements are preferably arranged such that two of the form-locking elements extend in longitudinal direction of the sensor housing.

In order to also be able to fix the projection in the recess in longitudinal direction of the sensor housing in a preferably form-locking manner, it is provided for two of the form-locking elements to extend transversely to the longitudinal direction of the sensor housing, wherein one of the form-locking elements extending transversely to the longitudinal direction can preferably be adjusted transversely to the longitudinal direction.

With respect to the design of the projection and the receiving means, no further details have so far been given. It is preferably provided, for example, for the form-locking elements extending in longitudinal direction of the sensor housing to have a cross section which is smaller than a cross section of the sensor housing in a cross-sectional area extending transversely to its longitudinal direction.

A particularly advantageous solution provides for the sensor housing to have the projection and the sensor holder to have the recess.

With respect to the design of the sensor holder, the most varied of possibilities are conceivable. One particularly advantageous embodiment provides for the sensor holder to be insertable into a groove of the functional unit and fixed in position in it.

In this respect, the sensor holder is preferably provided with projections engaging in undercuts of the groove so that the sensor holder itself can be fixed in position in the groove transversely to it by means of the projections.

In order to also bring about a fixing in position in longitudinal direction of the groove, it is preferably provided for the sensor holder to be fixed in position in longitudinal direction of the groove in a force-locking manner.

In this respect, the sensor holder is preferably provided with a fixing element, with which a groove base of the groove can be acted upon.

With respect to the dimensioning of the sensor holder itself, no further details have so far been given. One advantageous embodiment provides, for example, for the sensor holder to have a holder housing insertable into the groove.

In this respect, the holder housing is preferably designed such that it can be inserted into the groove essentially completely.

Furthermore, with respect to the positioning of the sensor housing it is likewise preferably provided for the sensor housing to be insertable into the groove essentially completely.

In principle, it would be conceivable to realize the fixing of the form-locking elements relative to one another and also the fixing of the holder housing via a common fixing device or a common fixing element.

It is, however, particularly advantageous when the fixing of the sensor holder on the functional unit and the fixing of the sensor housing on the sensor holder can be actuated independently of one another so that the sensor housing can be detached from the sensor holder without the sensor holder needing to be detached from the functional unit.

This solution has the particular advantage that with it the sensor holder can remain fixed in position on the functional unit even during the exchanging of the sensor itself.

It is particularly favorable when the sensor holder and the sensor housing can be connected to one another by positioning elements so as to be exactly positioned in a reproducible manner since, as a result, the adjustment of the inventive sensor assembly once achieved can also be achieved again when the sensor has to be exchanged on account of a defect and a new sensor has to be inserted since the new sensor is automatically held again by the sensor holder in the position of the sensor previously used.

In order to be able to keep the sensor as stable as possible relative to the functional unit it is preferably provided for the sensor holder to have a holding element engaging over the sensor housing on at least one side. As a result, a more stable fixing of the sensor housing relative to the functional unit can be achieved in addition to the form-locking fixing of the sensor housing on the sensor holder, in particular, in the case of any sudden load on the sensor housing due to an electric supply cable.

For example, the holding element could be arranged in this respect such that it is formed on a holding arm engaging over the sensor housing on one side.

However, it is also conceivable to design the holding element such that it forms a receiving means at least for one section of the sensor housing and thus engages over the sensor housing on more than one side, for example, on two sides.

It is particularly favorable when the holding element engages over the sensor housing on three sides. This solution can be used, in particular, when the sensor housing is intended to be positioned on a circumferential surface of the functional unit and cannot be inserted into a groove thereof.

With respect to the engagement of the holding element on the sensor housing, no further details have so far been given. It would be conceivable, for example, in the extreme case for the holding element to engage over the entire sensor housing. This would, however, make any exchange of the sensor by releasing the form-locking elements more difficult. For this reason, it is advantageously provided for the holding element to engage in the area of one half of the sensor housing bordering on the sensor holder.

However, the holding element preferably does not engage over the housing half of the sensor housing completely but rather only in sections when seen in longitudinal direction of the sensor housing, i.e., for example, the holding element engages over one half of the housing half or more but at the most the entire half of the housing.

BRIEF DESCRIPTION OF THE DRAWINGS

Additional features and advantages are the subject matter of the following description as well as the drawings illustrating several embodiments. In the drawings:

FIG. 3 shows a perspective illustration of the sensor holder in accordance with FIG. 2 with a holder housing cut away in longitudinal direction;

FIG. 4 shows a perspective illustration of the first embodiment of the inventive sensor assembly with a holder housing partially cut away in accordance with FIG. 3;

FIG. 5 shows a perspective illustration of a second embodiment of an inventive sensor assembly inserted into a groove of the first embodiment of a functional unit, the housing of which is partially broken away;

FIG. 6 shows an illustration similar to FIG. 3 of the sensor holder according to the second embodiment;

FIG. 7 shows an illustration similar to FIG. 4 of the second embodiment of the inventive sensor assembly;

FIG. 9 shows a perspective illustration similar to FIG. 3 of the sensor holder of the third embodiment;

FIG. 10 shows a perspective illustration similar to FIG. 4 of the third embodiment of the inventive sensor assembly;

FIG. 11 shows a perspective illustration of a fourth embodiment of the inventive sensor assembly placed on a third embodiment of the functional unit;

FIG. 12 shows an illustration similar to FIG. 3 of the sensor holder according to the fourth embodiment and FIG. 13 shows an illustration similar to FIG. 4 of the fourth embodiment of the inventive sensor assembly.

DETAILED DESCRIPTION OF THE INVENTION

Figure 1:
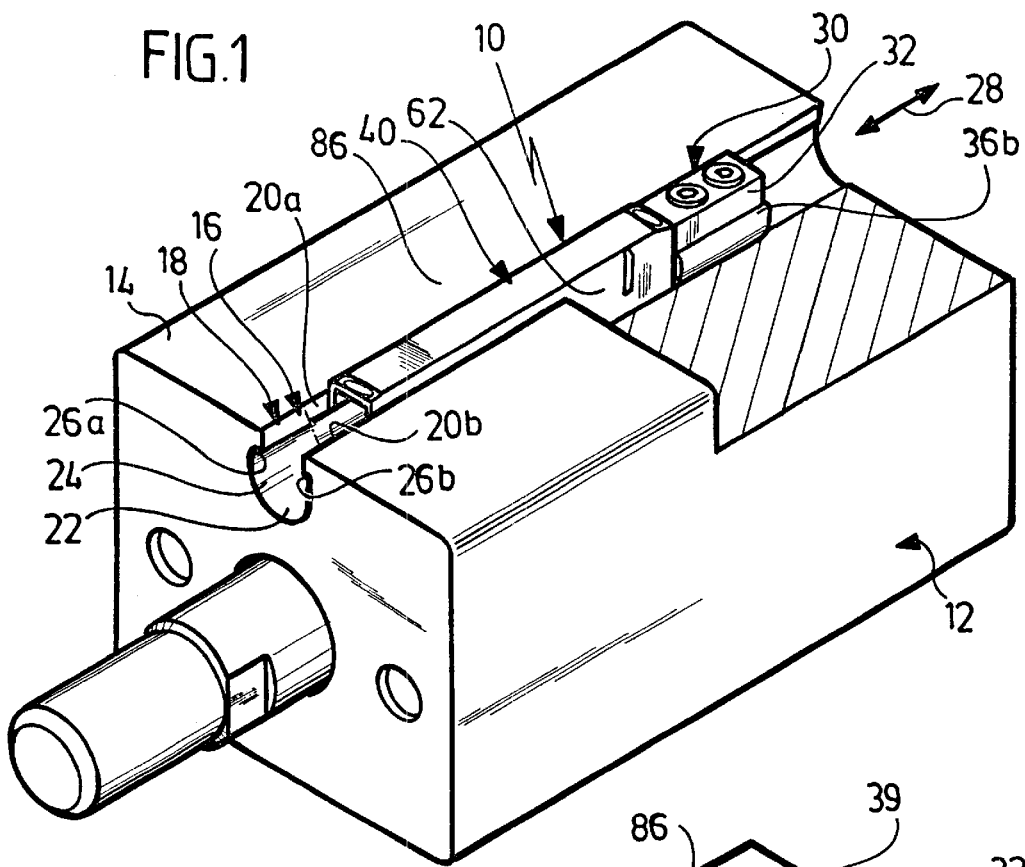
FIG. 1 shows a first embodiment of an inventive sensor assembly, inserted into a groove of a first embodiment of a functional unit, the housing of which is partially broken away.

A first embodiment of an inventive sensor assembly 10 serves to monitor a functional unit 12, for example, a pneumatic cylinder, wherein a housing 14 of the functional unit 12 has a groove 16, into which the sensor assembly 10 can be inserted.

The groove 16 has a groove opening 18 which is limited by side edges 20a and 20b and extends from the side edges 20a, 20b in the direction of a groove base 22, wherein an area 24 widened in cross section is located above the groove base 22 and extends as far as undercuts 26a, b located between the widened area 24 and the side edges 20a, b. The groove 16 preferably extends in its longitudinal direction 28 over the entire housing 14.

The inventive sensor assembly 10 comprises, for its part, a sensor holder designated as a whole as 30 as well as a sensor designated as a whole as 40, these two elements being arranged to follow one another in a longitudinal direction 31 and to be connectable to form a unit.

Figure 2:
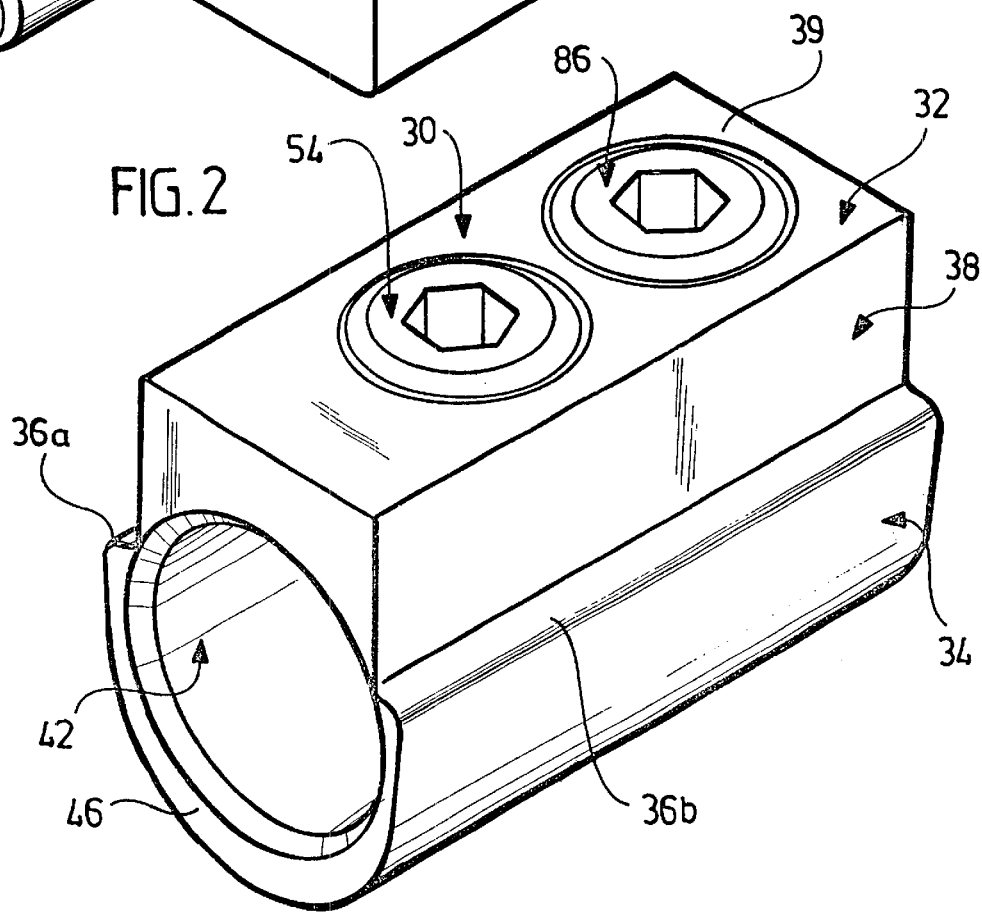
FIG. 2 shows a perspective illustration of a sensor holder of the first embodiment of the inventive sensor assembly.

The sensor holder 30 comprises, for its part, as illustrated in FIGS. 2 and 3, a holder housing 32 which has a lower area 34 which is provided with lateral projections 36a and 36b, wherein the lower area 34 can be inserted into the area 24 of the groove 16 widened in cross section and engages with the projections 36a and 36b in the undercuts 26a and 26b so that the lower area 34 cannot be removed from the groove 16 transversely to a longitudinal direction 28 thereof. Furthermore, an upper area 38 of the holder housing 32 is shaped such that it can be inserted between the side edges 20a, b of the groove 16, wherein the upper area 38 extends as far as an upper side 39 of the holder housing 32.

Moreover, the holder housing 32 is provided with a longitudinal bore 42 extending in a longitudinal direction 44 of the holder housing 32 which extends parallel to the longitudinal direction 31 of the sensor assembly and which extends at the same time parallel to the longitudinal direction 28 of the groove 16.

Proceeding from an end side 46 of the holder housing 32, this longitudinal bore 42 extends into this housing and ends, for example, at a wall 48.

Furthermore, a transverse bore 50 extends into the longitudinal bore 42 from the upper side 39 transversely to the longitudinal direction 44 of the holder housing 32, wherein the transverse bore 50 is provided with an internal thread 52, into which a screw 54 designed as a fixing element can be screwed with its external thread, wherein the screw 54 extends with its front end 58 in the screwed-in state right into the longitudinal bore 42.

The sensor 40 has, for its part, a sensor housing 62 which extends with a longitudinal direction 60 parallel to the longitudinal direction 31 and is designed in such a manner that it can likewise be inserted into the groove 16, wherein the sensor housing 62 has transversely to the longitudinal direction 60 such a cross section between its side surfaces 63a and 63b that it can be inserted into the groove 16 through the groove opening 18 in the direction of the groove base 22 transversely to the longitudinal direction 28 of the groove and thus has no projections which engage in the undercuts 26a, b.

The height of the sensor housing 62 between an upper side 64 and a lower side 65, with which the sensor housing 62 rests on the groove base 22 in the position inserted into the groove 16, corresponds approximately to the height of the groove 16, wherein the upper side 64 projects slightly above the groove opening 18.

A sensor element S and evaluation electronics A are arranged in the sensor housing, wherein the sensor element S is preferably located close to the underside 65.

Furthermore, an electric connection cable 68 leading away from the evaluation electronics A is guided out of the sensor housing 62 in the area of one end 66 whereas a holding pin 72 is provided at an oppositely located end 70, this pin being reduced in cross section in relation to the sensor housing 62, being introducible into the longitudinal bore 42 of the sensor holder 30 serving as a receiving means for it and having a transverse bore 74, into which the screw 54 can be screwed with its front end 58 in order to fix the holding pin 72 in position in the longitudinal bore 42 in a form-locking manner in the direction of the longitudinal direction 44.

The sensor housing 62 is preferably designed such that the upper side 64 thereof is approximately aligned with the upper side 39 and that, in addition, the cross section of the sensor housing 62 corresponds approximately to the cross section of the upper area 38 of the holder housing 32 so that the sensor housing 62 is guided in the groove 16 with the side surfaces 63a, 63b by means of the side edges 20a, 20b of the groove opening 18 and with the underside 65 by means of the groove base 22.

Furthermore, for securing the sensor holder 30 in the groove 16 the holder housing 32 is provided on a side of the longitudinal bore 42 located opposite the sensor housing 62 with a transverse bore 76 which proceeds from the upper side 39, passes through the entire holder housing 32 and has an internal thread 78, wherein a screw 80 with an external thread 82 can be screwed into the transverse bore, namely to such an extent that this is in a position to exit from a lower opening 86 of the transverse bore 76 with its front end 84 and act upon the groove base 22 of the groove 16 so that the entire holder housing 32 lifts away from the groove base 22 to such an extent until its projections 36a, 36b abut on the undercuts 26a, b and can thus be clamped against them by the screw 80, wherein the screw 80 can dig slightly into the groove base 22 with the front end 84 to improve the fixing in position in the groove 16.

The inventive sensor assembly 10 may preferably be mounted in the functional unit 12 to be monitored in that either the sensor holder 30 or the entire sensor assembly are inserted into the groove 16 from one end thereof and in longitudinal direction 28 thereof. A connection between the sensor 40 and the sensor holder 30 is brought about at the latest in the groove 16 in that the holding pin 72 is pushed into the longitudinal bore 42 and fixed in position in the longitudinal bore 42 by the screw 54 in a form-locking manner so that the sensor 40 and the sensor holder 30 form a unit connected in a form-locking manner.

The entire sensor assembly 10 is now displaced in the groove 16 for such a time until the desired detection position for the sensor element S, for example, the desired position for a specified position of a piston of the functional device is reached.

In this position, the sensor holder 30 and thus the entire sensor assembly 10 is fixed in position in the groove by tightening the screw 80.

If, for example, a defect is present in the sensor 40 or the sensor 40 is intended to be exchanged for any other reasons, it is not necessary to exchange the entire sensor assembly 10 but rather it is sufficient to release the screw 54 and withdraw the sensor 40 with the holding pin 72 from the longitudinal bore 42 and exchange it for a different sensor 40.

This new sensor 40 can likewise be pushed into the longitudinal bore 42 again with its holding pin 72 and fixed in position in a form-locking manner with the screw 54, wherein the new sensor 40 is automatically adjusted exactly in the same position as the sensor 40 used before it and so no readjustment whatsoever is required in order to carry out the same position measurements with this new sensor 40 as with the preceding sensor 40.

The determination of the exact position of the sensor housing 62 relative to the sensor holder 30 is brought about either by the screw 54 engaging in the transverse bore 74 or, in addition, by the one contact surface, for example, the wall 48 or the end side 46, against which the pin 72 or the sensor housing 62 abut when the screw 54 is screwed into the transverse bore 74.

Furthermore, in the case of the inventive solution the sensor 40 is protected together with the sensor holder 30 to a great extent due to its arrangement in the groove 16 of the functional unit 12 since the upper sides 64 and 39 of the sensor 40 and the sensor holder 30 are preferably aligned more or less with an outer side 86, in which the groove opening 18 is located.

In a second embodiment of an inventive sensor assembly, illustrated in FIGS. 5 to 7, those elements which are identical to those of the first embodiment are given the same reference numerals and so, with respect to the description thereof, reference is made in full to the comments on the preceding embodiment.

In contrast to the first embodiment, the holder 30' in the second embodiment is, however, provided with a holding arm 90 which extends in the direction of the sensor 40 proceeding from the end side 46 and extends over a section of the extension of the sensor housing 62 over the upper side 64 thereof in the direction of the longitudinal direction 44 and rests on the upper side 64 of the sensor housing 62 at least with an end area designed as a hold-down element 92 in order to protect the housing against any movement out of the groove 16, for example, in the case, in which a pulling effect on the connection cable 68 takes place.

The hold-down element 92 preferably acts in the area of one half 94 of the housing proceeding from the end 70 of the sensor housing.

As for the rest, the second embodiment is designed in the same way as the first embodiment and so reference can be made to this in full.

Figure 8:
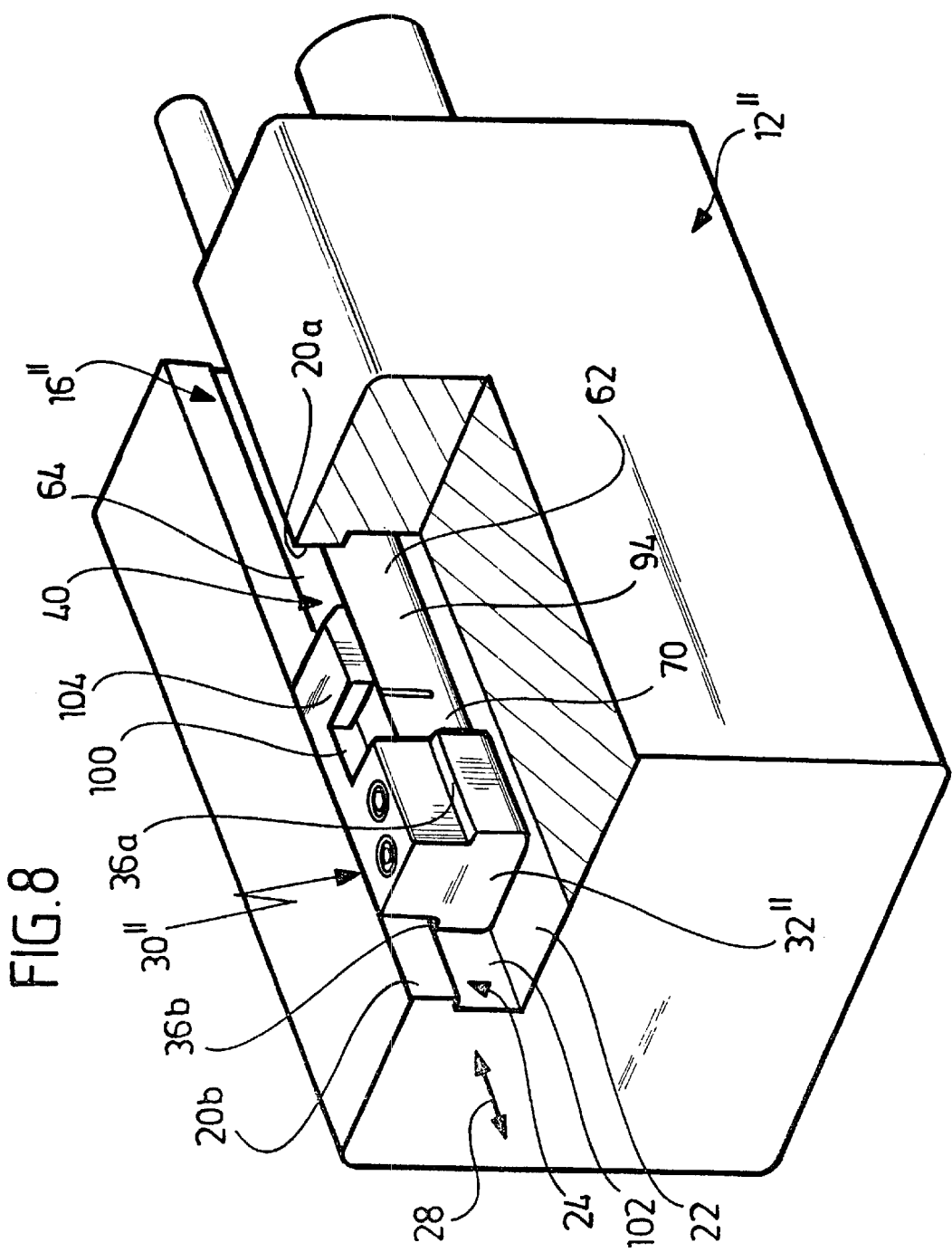
FIG. 8 shows a perspective illustration of a third embodiment of an inventive sensor assembly inserted into a groove of a second embodiment of the functional unit.

In a third embodiment of an inventive sensor assembly, illustrated in FIGS. 8, 9 and 10, those elements which are identical to those of the first and second embodiments are given the same reference numerals and so, with respect to the description thereof, reference can be made in full to the comments on the preceding embodiments.

In contrast to the second embodiment, it is not the holding arm 90 which extends, in the case of the sensor holder 30", from the end side 46 of the holding housing 32 but rather a side wall 100 which is located between the sensor housing 62 and a wall surface 102 of the groove 16 in its widened area 24 since the groove 16" is, in this case, of a broader design.

The side wall 100 bears, for its part, a hold-down element 104 which acts on the upper side 64 of the sensor housing 62 in the area of the half 94 of the housing adjoining the end 70 in order to likewise fix the sensor 40 in position in the groove 16" in addition to the holding pin 72.

At the same time, the side wall 100 serves, on the one hand, to support the sensor housing 62 in the groove 16 of a broader design by means of the side wall 100 and, on the other hand, to abut on the opposite side on an inner side of the groove 16', preferably in the area of the side edge 20a, and thus to likewise contribute to the sensor housing 62 being secured against forces acting transversely to the longitudinal direction 28 of the groove 16" and approximately parallel to the groove base 22.

As for the rest, the third embodiment is also designed in the same way as the first embodiment and so, with respect to the remaining features, reference can be made in full to the first embodiment.

In a fourth embodiment, illustrated in FIGS. 11 to 13, the functional unit 12'" is not provided with a groove but rather has, for example, a cylindrical casing surface 110.

In this embodiment, the sensor holder 30''' can thus be fixed in position on the casing surface 110 of the functional unit 12''' by means of a fixing element 112, wherein this fixing element 112 is designed, for example, as a tension band which acts on a tongue 114 which is integrally formed on the holder housing 32''', rests with its underside 116 on the casing surface 110 and can be fixed in position on the casing surface 110 in a force-locking manner by means of the tension band 112 which acts on an upper side 118 thereof.

Furthermore, the holder housing 32''' has, adjoining the end side 46, a housing receiving means 120 which extends at least partially over the half 94 of the housing adjoining the end 70 of the sensor housing 62 and engages around the sensor housing 62 not only in the area of the upper side 64 but also of both side walls 63a, 63b so that the sensor housing 62 rests on the casing surface 110 only with its underside 65 and is thus fixed in position on all sides in the area of the housing half 94 by means of the holder housing 32.

The advantage of the different sensor holders 30, 30', 30'' and 30''' is to be seen in the fact that the same sensor 40 with the same dimensions of the sensor housing 62 and the same dimension of the holding pin 72 can always be inserted and, depending on the design of the functional unit, only the sensor holder 30, 30', 30'' and 30''' has to be adapted to the different conditions of the functional unit in order to always fix the sensor 40 in position on the functional unit securely and reliably.

In all cases it is likewise possible to fix the sensor 40 in position in the same way in all the embodiments of the sensor holder 30, 30', 30'' and 30''' by releasing the form-locking fixing of the sensor 40 by means of the holding pin 72 engaging in the longitudinal bore 42 and the screw 54 engaging in the transverse bore 74, wherein the sensor 40 can always be removed and replaced by a different sensor 40 which is then automatically arranged in the same position as the sensor 40 already removed following its form-locking connection to the sensor holder 30, 30', 30'', 30''' when the sensor holder 30, 30', 30'', 30''' is still fixed in position on the functional device 12.

What is claimed is:

1. Sensor assembly comprising:
   a sensor adapted to be fixed in position on a functional unit and having a sensor housing,
   a sensor element with evaluation electronics being arranged in said housing, and
   a sensor holder adapted to be inserted into a groove of the functional unit and fixed in position in the functional unit and adapted to be brought into a position in line with the sensor housing in the groove and to be detachably connected to the sensor housing in this in-line position by means of form-locking elements and wherein the sensor is adapted to be fixed in position on the functional unit by means of the sensor holder.

2. Sensor assembly as defined in claim 1, wherein one of the form-locking elements is a projection and the other a recess.

3. Sensor assembly as defined in claim 1, wherein two of the form-locking elements extend in longitudinal direction of the sensor housing.

4. Sensor assembly as defined in claim 3, wherein the form-locking elements extending in longitudinal direction of the sensor housing have a cross section smaller than a cross section of the sensor housing in a cross-sectional area extending transversely to its longitudinal direction.

5. Sensor assembly as defined in claim 1, wherein two of the form-locking elements extend transversely to the longitudinal direction of the sensor housing.

6. Sensor assembly as defined in claim 5, wherein one of the form-locking elements extending transversely to the longitudinal direction is adjustable transversely to the longitudinal direction.

7. Sensor assembly as defined in claim 1, wherein the sensor holder is provided with projections engaging in undercuts of the groove.

8. Sensor assembly as defined in claim 1, wherein the sensor holder is adapted to be fixed in position in longitudinal direction of the groove in a force-locking manner.

9. Sensor assembly as defined in claim 8, wherein the sensor holder is provided with a fixing element for acting upon a groove base of the groove.

10. Sensor assembly as defined in claim 1, wherein the sensor holder has a holder housing insertable into the groove.

11. Sensor assembly as defined in claim 10, wherein the holder housing is designed such that it is insertable into the groove essentially completely.

12. Sensor assembly as defined in claim 1, wherein the sensor housing is insertable into the groove essentially completely.

13. Sensor assembly as defined in claim 1, wherein the fixing of the sensor holder on the functional unit and the fixing of the sensor housing on the sensor holder are actuatable independently of one another.

14. Sensor assembly as defined in claim 13, wherein the sensor holder and the sensor housing are connectable to one another by positioning elements so as to be exactly positioned with respect to the functional unit in a reproducible manner.

15. Sensor assembly as defined in claim 1, wherein the sensor holder has a holding element engaging over the sensor housing on at least one side.

16. Sensor assembly as defined in claim 15, wherein the holding element is formed on a holding arm engaging over the sensor housing on one side.

17. Sensor assembly as defined in claim 15, wherein the holding element forms a receiving means for at least one section of the sensor housing.

18. Sensor assembly as defined in claim 15, wherein the holding element engages in the area of a housing half of the sensor bordering on the sensor holder.

19. Sensor assembly comprising:
   a sensor adapted to be fixed in position on a functional unit and having a sensor housing,
   a sensor element with evaluation electronics being arranged in said housing, and
   a sensor holder adapted to be brought into a position following the sensor housing in longitudinal direction and to be detachably connected to the sensor housing in said position by means of form-locking elements and wherein the sensor is adapted to be fixed in position on the functional unit by means of the sensor holder;
   wherein the sensor holder has a holding element engaging over the sensor housing on at least one side.

20. Sensor assembly as defined in claim 19, wherein the holding element is formed on a holding arm engaging over the sensor housing on one side.

21. Sensor assembly as defined in claim 19, wherein the holding element forms a receiving means for at least one section of the sensor housing.

22. Sensor assembly as defined in claim 19, wherein the holding element engages in the area of a housing half of the sensor bordering on the sensor holder.

* * * * *